United States Patent [19]

Lundin

[11] 4,349,957
[45] Sep. 21, 1982

[54] METHOD OF MAKING A BOBBIN WOUND STEPPING MOTOR

[75] Inventor: Robert S. Lundin, Northfield, Conn.

[73] Assignee: The Superior Electric Company, Bristol, Conn.

[21] Appl. No.: 145,121

[22] Filed: Apr. 30, 1980

Related U.S. Application Data

[63] Continuation of Ser. No. 946,468, Sep. 28, 1978, abandoned.

[51] Int. Cl.³ ............................................. H02K 15/02
[52] U.S. Cl. ....................................... 29/596; 29/467; 29/468; 29/732
[58] Field of Search ................. 29/596, 467, 468, 732; 310/162, 164, 257, 49 R, 42, 46, 156

[56] References Cited

U.S. PATENT DOCUMENTS

| | | | |
|---|---|---|---|
| 1,527,162 | 2/1925 | Alvord | 29/596 |
| 3,256,590 | 6/1966 | Myers | 29/596 |
| 3,464,107 | 9/1969 | Geisenhaver | 29/468 X |
| 3,633,055 | 1/1972 | Maier | 310/162 X |

*Primary Examiner*—Carl E. Hall

[57] ABSTRACT

A bobbin wound stepping motor has a stator formed of a plurality of stamped metal pieces that are concentrically secured together by projection welding through the use of an arbor except for its rear plate which is positioned concentrically by locating holes and half-blanks and secured in the assembled motor by push nuts after insertion of the rotor.

22 Claims, 12 Drawing Figures

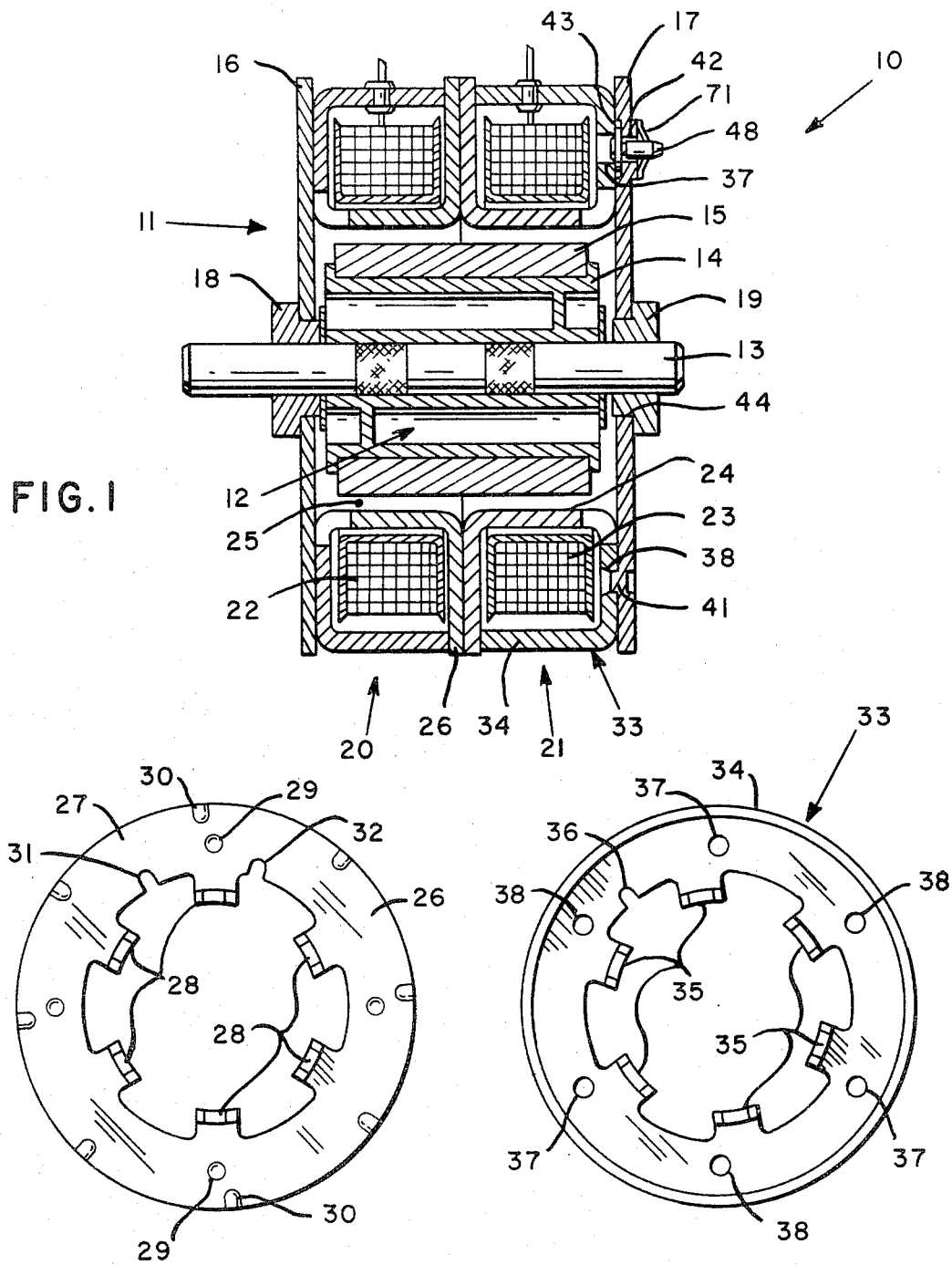

METHOD OF MAKING A BOBBIN WOUND STEPPING MOTOR

This is a continuation of my application Ser. No. 946,468 filed Sept. 28, 1978, now abandoned.

The present invention relates to a type of motor that includes two circular or bobbin windings. Each winding is enclosed within a metal annulus that includes an inner periphery formed with axially spaced poles. A rotor is positioned within the inner periphery and by appropriate energization of the windings, the rotor is urged to move a fraction of a revolution for each change of energization.

While such motors have heretofore been known, they have presented difficulties in being manufactured within industry acceptable tolerances in an economical manner. The rotor typically has a larger inner diameter than its shaft diameter which is supported in bearings and one difficulty has been assembling the plurality of pieces that form the annuli so that they will be assuredly concentric, not only with each other but also with the bearings and hence the rotor. In addition, the need for a relatively large number of unique parts has also tended to increase the cost of manufacture.

It is accordingly an object of the present invention to provide a bobbin wound stepping motor that may be economically manufactured repeatedly within commercially acceptable tolerances.

Another object of the present invention is to achieve the above object with a stepping motor that while capable of being quickly assembled from a plurality of pieces, assures that the pieces will be assembled concentrically.

A further object of the present invention is to provide a stepping motor of the bobbin wound type that is reliable and durable in use and, though composed of a plurality of pieces, the number of unique pieces is minimized to reduce the cost of fabrication.

In carrying out the present invention, the stator of the motor is formed of six pieces stamped from sheet metal. A front mounting plate and a rear support plate constitute two of the pieces and each carries a bearing for supporting the rotor. The other four pieces form two annuli with each annulus consisting of two essentially identical pieces, one a cup pole piece and the other a flat pole piece. In one embodiment of the invention, each cup piece is stamped from a single piece of metal while in another embodiment, it consists of a subassembly formed by a ring and a flat piece. All pole pieces are stamped to have poles that are bent to define the inner periphery of each annulus that cooperates with the rotor to provide the torque urgings to the rotor.

The two flat pole pieces are initially secured together while positioned on an arbor by the use of projection welding with the arbor maintaining concentricity and angular orientation. The coils are placed within the two cup pieces which are then individually placed on the arbor to assure concentricity and the pieces fastened together also by projection welding. The front plate is fastened to one of the cup pieces also by projection welding and also while positioned on the arbor. The use of an arbor during assembly assures that the pieces will be concentric and correctly positioned angularly when fastened together.

Each of the above parts are stamped from sheet metal with the two pieces for each annuli being identical. However, the cup piece to which the rear plate is attached is formed to have a plurality of locating holes formed therein together with a plurality of studs welded thereto. In the herein disclosed specific embodiment, the rear plate has three projections that fit within the locating holes and three fastening holes. After the rotor has been positioned within the annuli, the rear plate is positioned to have its projections fit within the locating holes thereby assuring concentricity between the rear plate and the annuli and the motor is completed by push nuts being forced onto the studs to hold the rear plate in position.

Other features and advantages will hereinafter appear.

In the drawing

FIG. 1 is a diametrical axial section of the motor of the present invention, shown essentially full size.

FIG. 2 is a plan of a flat pole piece.

FIG. 3 is a plan of a cup pole piece.

Figures 4, 5:
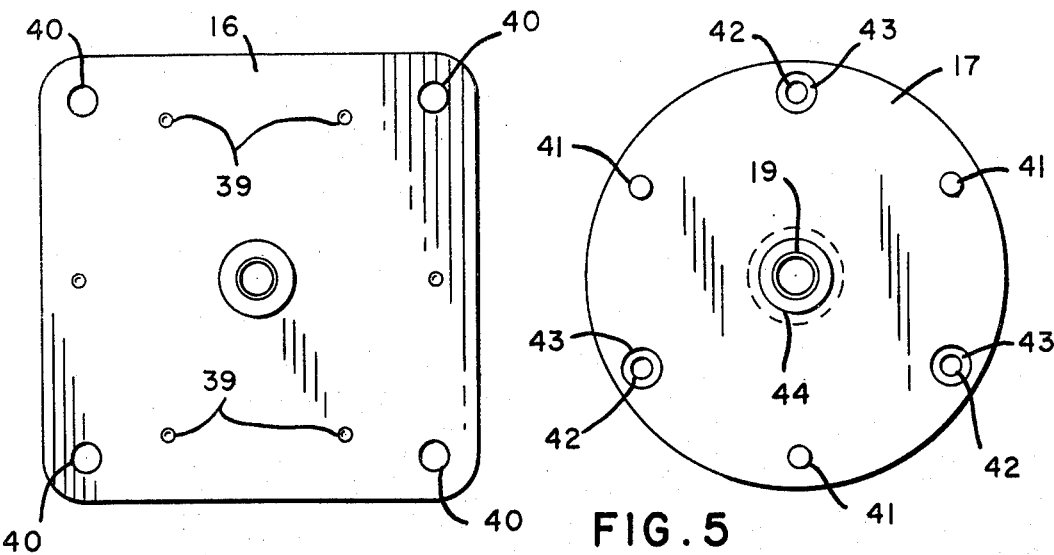
FIG. 4 is a plan of a front mounting plate.
FIG. 5 is a plan of the rear support plate.

Referring to the drawing, the stepping motor of the present invention is generally indicated by the reference numeral 10 and includes a stator 11 and a rotor 12. While the rotor may be of any desired construction that produces a step with a change of energization of the stator 11, it is herein specifically disclosed as having a shaft 13 on which is secured a hub 14. The hub carries a cylindrical ceramic magnet 15 which has longitudinal areas of different magnetic polarization.

The stator 11 includes a front mounting plate 16 and a rear support plate 17, each of which has press fitted therein a bearing, 18 and 19 respectively, with the bearings supporting the shaft 13 for rotation. Located between the plates 16 and 17 are first and second annuli 20 and 21 with each annulus including a circularly wound, bobbin coil 22 and 23, respectively.

The annuli define in effect a toothed inner periphery 24 that is radially aligned with the magnetized magnet 15 to define an air gap 25 therebetween. Typically, the air gap is on the order of about 0.010 of an inch and should be uniform to assure enhanced, consistant output torque. To achieve such an air gap, the inner periphery must be cylindrical and the rotor must be supported by the bearings in the plates to have the axis of its shaft coincide with the axis of the cylindrical inner periphery 24.

In accordance with the present invention to attain concentricity and economy, each annulus includes a flat pole piece 26, as shown in FIG. 2. The pole piece is stamped from sheet steel of perhaps 0.072 inch thickness to have a circular ring 27 from which equally spaced poles 28 project at right angles thereto. In the specific embodiment shown, six poles are formed providing 24 steps per revolution when the magnet 15 has 12 north and 12 south magnetized areas. Inner and outer resistance welding dimples or protrusions are also formed as at 29 and 30 while indexing notches 31 and 32 are cut into the piece, as shown.

Each annulus further includes a cup pole piece 3 shown specifically in FIG. 3 which is formed to have an L-shaped ring 34 together with integral, axially projecting poles 35 and an indexing notch 36. At least one of the cup pieces is formed with three equally spaced apertures 37 and three equally spaced aligning holes 38. The apertures 37 and holes 38 are circularly located with respect to the inner periphery of the teeth and like the piece 26, each piece is also stamped from sheet metal again on the order of perhaps 0.072 of an inch thick.

The front plate 16, shown in FIG. 4, is also stamped from sheet metal to have a square shape, circularly arranged welding protrusions 39 and mounting holes 40 formed in each corner.

The rear support plate 17, also stamped from sheet metal and shown in FIG. 5, is preferably circular in shape and formed to have three projections 41 which are formed by half-blanking a hole so that the projections 41 are flat and circular (as shown in FIG. 1) as opposed to the conical protrusions used for welding, such as protrusions 39. Further, three holes 42 are pierced and the periphery 43 about these holes is half-blanked outwardly to provide in effect a counter sunk recess 43'. As shown, the bearing 19 is positioned in a center hole 44 of the plate 17. The hole 44 for the bearing is pierced at the same operation that forms the half-blank projections 41 so that with only one tool and one operation, concentricity between the bearing hole and the half-blanks is assured. The bearing 19 has a slight interference fit with its mating hole.

Figures 6, 7:
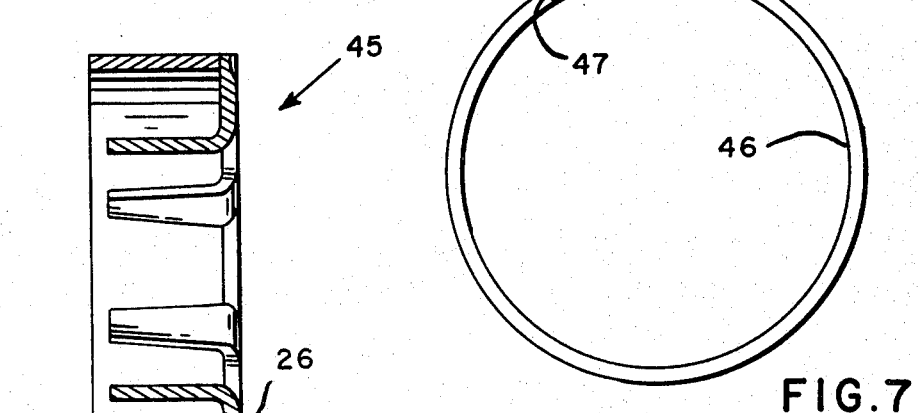
FIG. 6 is a diametrical axial section view of another embodiment of a cup piece.
FIG. 7 is a plan of the ring of FIG. 6.

Shown in FIGS. 6 and 7 is a cup piece 45 formed as a subassembly of a ring 46 and a flat pole piece 26. The ring may be cut from tubing or assembled from bent strip stock by use of a welded joint 47, for example, and is secured to the flat piece by projection welding using the outer protrusions 30 on the flat piece. Except for being formed of two pieces, the cup piece 45 is identical to the cup piece 33 and may includes holes 37 and apertures 38 (not shown).

Figure 8:
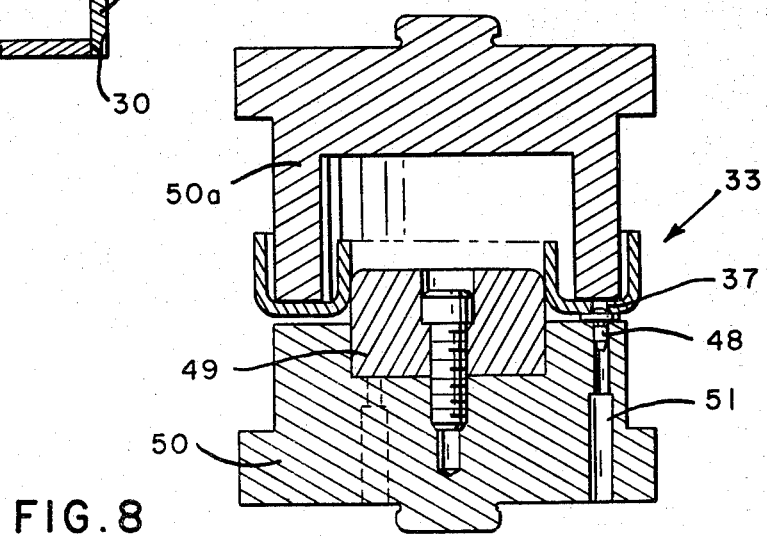
FIGS. 8 through 12 are diametrical axial sectional representations of sequential assembly steps.

As shown in FIG. 8, three studs 48 are projection welded to the rear cup piece 33 of annuli 21 as by the use of a centering arbor 49 and a lower electrode 50 formed with holes 51 for receiving the studs. An upper electrode 50a is also shown. It will be noted that the studs are not utilized for centering the rear plate and hence the stud concentricity need not be as precise as if they were used to center the rear plate. The studs are positioned to have a head positioned in each of the apertures 37.

Figure 9:
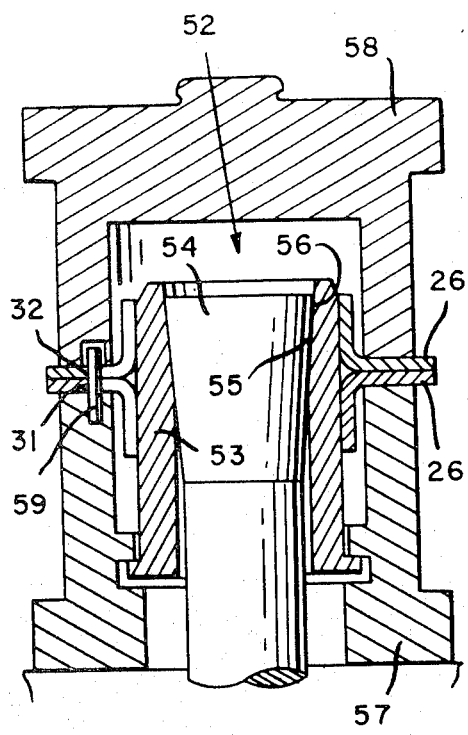
Figure 10:
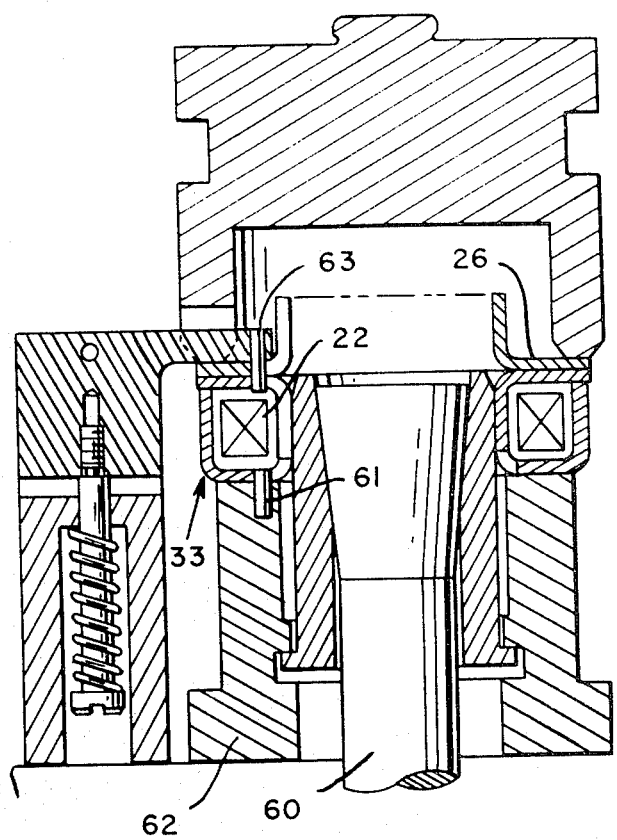

With the parts so constructed, two of the flat pieces 26 are placed back-to-back on an arbor 52 as shown in FIG. 9. The arbor has an outer ring 53 formed of resilient material such as "Teflon" which has a plurality of partial, axial splits which enables its outer periphery to be slightly expandable, on the order of perhaps 0.010 inches diameter, by the forcing of a mandril 54 downwardly. The frusto-conical periphery 55 of the mandril mates with a frusto-conical surface 56 forced on the inner surface of the ring to effect the expanding force on the outer ring 53. The ring 53 is supported by a lower, cup-shape resistance welding electrode 57 while another cup-shaped electrode 58 is mounted for movement towards and away therefrom.

After placing the pieces 26 on the arbor, they are caused to be radially displaced a fraction of a pole pitch by causing notch 31 of one piece to be aligned with notch 32 of the other piece as by a pin 59 carried by the lower electrode 57. The arbor is then expanded to center the two pieces thereon, the electrodes brought together as shown and current passed therebetween to resistance weld the pieces together using the protrusions 29.

Figure 11:
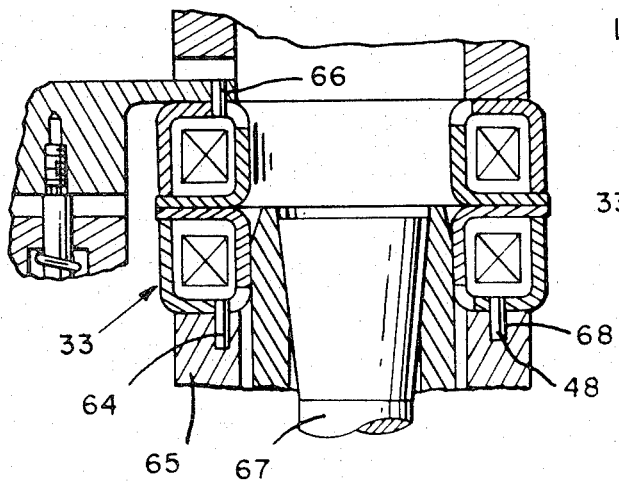
Figure 12:
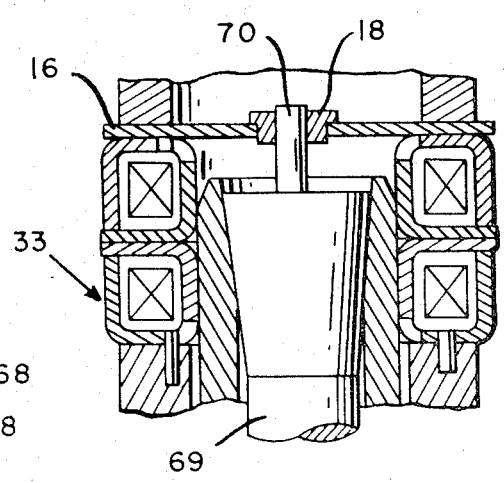

Subsequently, the coil 22 is placed within its cup piece 33 and the cup piece is placed on an expandable arbor 60 with the required radial and angular alignment being achieved by the use of an aligning pin 61 carried by the lower electrode 62 that becomes positioned in the notch 36 and an exterior axially movable pin 63 that engages the notches that were previously engaged in FIG. 9 by pin 59. The other cup piece 33 is secured as shown in FIG. 11 by the use of an aligning pin 64 carried by the lower electrode 65 and an exterior axially movable pin 66 similar to the pin 59 with both pins engaging notches in their respective cup pieces. A similar type arbor 67 is employed. The cup pieces are welded using the outer protrusions 30 formed on the flat pole pieces 26. The lower electrode is formed with openings 68 to accommodate the studs 48.

A similar type arbor 69 includes an accurately, concentrically located pilot 70 which is caused to pass into the bearing 18 of the front mounting plate 16 as shown in FIG. 11 when the plate is positioned on the mandril. Again electric current is passed through the pieces to resistance weld the front plate to the adjacent cup piece 33 using the protrusions 39 formed on the front plate.

The use of an arbor which is basically indentical in all welding operations and on which each part except the rear plate is positioned during its securement assures that the parts will be secured together concentrically.

With the five metal pieces so assembled, the rotor 12 is positioned, as shown in FIG. 1, within the stator and the rear plate 17 positioned against its adjacent cup piece 33. Each stud 48 projects through its associated hole 42 in the rear support plate while the half-blanked projections 41 closely fit within the aligning holes 38 of the cup piece to effect the centering of the rear plate with respect to the other pieces. The plate 17 is fastened in this position by a push nut 71 being forced onto each stud with the recesses 43' in the rear plate accommodating the heads of the studs 48. The plate 17 thus is held abutting the cup piece which assures that the half-blanked projections will remain within the aligning holes 38 to maintain concentricity of the rear plate.

It will accordingly be understood that there has been disclosed a bobbin wound stepping motor which though being capable of economic fabrication, provides relatively precise concentricity between the rotor and the stator. The stator includes a plurality of stamped sheet metal parts, some of which are duplicates, and the parts are secured together while being maintained concentric on an arbor. Moreover, the arbor includes indexing devices for correctly angularly positioning the different parts to assure the accurate location of the poles formed on the parts with respect to each other.

Variations and modifications may be made within the scope of the claims and portions of the improvements may be used without others.

What is claimed is:

1. The method of assembling the stator of a motor having at least two annular units each including an annular coil and a toroidal core structure containing said coil, each said core structure including first and second pole parts each having an annular pole portion and said pole parts having respective sequences of poles upstanding from respective circular margins of said annular pole portions and regularly distributed in alternation but spaced apart arcuately in cylindrical array, the poles of said first annular unit being offset arcuately from the poles of said second annular unit, each pole having an air-gap-bounding surface spaced by an air gap from the rotor of the motor, including the steps of assembling one pole part of each of two toroidal core structures with their annular pole portions in slideable abutment with each other in approximate concentricity and with the poles thereof extending in opposite directions and establishing said arcuately offset relationship between said sequences of poles, adjusting said sequences of poles into concentricity by engaging said air-gap-bounding surfaces of the poles radially with a common radially adjustable concentricity establishing device that presses radially in all directions against said air-gap-bounding surfaces, and securing the pole pieces to each other in axial abutment while the pole parts are in their arcuate and concentric relationship thus established.

2. The method of claim 1 wherein said circular margins along which said upstanding poles are distributed are inner margins of said annular pole portions, and wherein said concentrically establishing device presses radially outward in all directions.

3. The method of claim 1,
the motor having at least first and second annular units each including an annular coil and a toroidal core structure containing said coil, each said core structure including a companion pair of pole parts each having an annular pole portion and said pole parts having respective sequences of poles upstanding from respective circular margins of said annular pole portions and regularly distributed in alternation but spaced apart arcuately in cylindrical array, each said pole having an air-gap-bounding surface separated by an air gap from the rotor of the motor, the companion pole parts of each said toroidal core structure having portions abutting each other axially, said method including performing the following steps (1) and (2) in succession after the steps of claim 1:
(1) assembling the pole parts of the first toroidal pole structure in slideable axial abutting relationship to each other with the coil interposed between the companion pole parts thereof and with the poles of the companion pole parts interleaved and in approximate concentricity, establishing a desired arcuate relationship between the poles of said pole parts of the first annular unit, adjusting the air-gap-bounding surfaces of said interleaved poles into concentricity by engaging them with a radially adjustable concentricity establishing device that presses radially in all directions against the air-gap-bounding surfaces of the poles, and securing said companion pole part together while holding the companion pole parts in axial abutment and in their arcuate and concentric relationship thus established, and
(2) the steps in the foregoing process (1) with respect to said second annular unit.

4. The method of assembling the stator of a motor as set forth in claim 3 wherein said circular margins along which the upstanding poles are distributed are inner margins of the related annular pole portions and wherein each said concentricity establishing device presses radially outward.

5. The method as in claim 1 wherein a fixture is brought into cooperation with a reference formation of each of said pole parts for establishing said arcuately offset relationship between said sequences of poles.

6. The method as in claim 1 wherein each of said assembled pole parts has a radial slot in the annular pole portion thereof and wherein a common locating element is positioned in the slots of both of the assembled pole parts for establishing said arcuately offset relationship between said assembled pole parts.

7. The method as in claim 2 wherein each of said assembled pole parts has a radial slot in the annular pole portion thereof and wherein a common locating element is positioned in the slots of both of the assembled pole parts for establishing said arcuately offset relationship between said assembled pole parts.

8. The method as in claim 3 wherein, as to each said annular unit of the motor, a first one of said companion pole parts has an annular wall that abuts the annular pole portion of a second of the companion pole parts, and wherein said cylindrical wall and the annular pole portion of said second pole part establish said slidable axially abutting relationship when the companion pole parts are initially assembled.

9. The method as in claim 4 wherein, as to each said annular unit of the motor, a first one of said companion pole parts has an annular wall that abuts the annular pole portion of a second of the companion pole parts, and wherein said cylindrical wall and the annular pole portion of said second pole part establish said slidable axially abutting relationship when the companion pole parts are initially assembled.

10. The method of assembling the stator of a motor having at least one annular unit including an annular coil and a toroidal core structure containing said coil, said core structure including first and second companion pole parts each having an annular pole portion and said pole parts having respective sequences of poles upstanding from respective circular margins of the annular pole portions and regularly distributed in alternation but spaced apart arcuately in cylindrical array, each pole having an air-gap-bounding surface spaced by an air gap from the rotor of the motor, said companion pole parts having portions abutting each other axially, including the steps of assembling the pole parts of said toroidal pole structure in slidable axially abutting relationship to each other with the coil interposed between the companion pole pieces and with the poles of said pole parts interleaved in a cylindrical array and in approximate concentricity, establishing a desired arcuate relationship between the poles of said pole parts, adjusting the air-gap-bounding surfaces of said interleaved poles into concentricity by engaging them with a common radially adjustable concentricity establishing device that presses radially in all directions against said air-gap-bounding surfaces, and securing the pole parts together in axial abutment and in their arcuate and concentric relationship thus established.

11. The method of claim 10 wherein said circular margins along which said upstanding poles are distributed are inner margins of said annular pole portions, and wherein said concentricity establishing device presses radially outward in all directions.

12. The method as in claim 10 wherein locating elements are brought into cooperation with locating formations of said pole parts, respectively, for establishing said desired arcuate relationship.

13. The method as in claim 10 wherein each of said pole parts of each said toroidal pole structure has a radial opening in the annular pole portion thereof and wherein locating portions of a fixture are positioned in said openings for establishing said desired arcuate relationship between the assembled pole parts.

14. The method as in claim 11 wherein each of said pole parts of each said toroidal pole structure has a radial opening in the annular pole portion thereof and wherein locating portions of a fixture are positioned in said openings for establishing said desired arcuate relationship between the assembled pole parts.

15. The method as in claim 10 wherein, as to each said annular unit of the motor, a first one of said companion pole parts has an annular wall that abuts the annular pole portion of a second of the companion pole parts, and wherein said cylindrical wall and the annular pole portion of said second pole part establish said slidable axially abutting relationship when the companion pole parts are initially assembled.

16. The method as in any one of claims 1, 10, 2-4, 7, or 9-14 wherein said pole parts have resistance welding projections where they are in abutment initially and wherein securing the parts to each other is effected by resistance welding, and wherein said common concentricity establishing device has a pole-engaging surface of electrical insulation for avoiding welding-current paths between said poles through said device.

17. The method as in claims 15, 8 or 9 wherein each of said pole parts of each said toroidal pole structure has a radial slot in the annular pole portion thereof and wherein locating portions of a fixture are positioned in said slots for establishing said desired arcuate relationship between the assembled pole parts, and wherein the abutting pole parts are secured together by resistance welding.

18. The method of assembling the stator of a motor having at least one annular unit including an annular coil and a toroidal core structure containing said coil, said core structure including first and second annular pole parts each having an annular pole portion and respective sequences of poles upstanding from a circular margin of the annular pole portion and regularly distributed arcuately in cylindrical array, each pole having an air-gap-bounding surface spaced by an air gap from the rotor of the motor, said toroidal core structure and any additional core structures of the motor having adjacent annular core parts in succession along the axis of the motor, said method including the steps of assembling adjacent annular core parts of said motor to each other with the poles thereof in approximate concentricity and establishing a desired arcuate relationship between the poles of the adjacent pole parts of the motor by arcuate locating means which is spaced from said upstanding poles and which accommodates radial shift of said adjacent pole parts in relation to each other, adjusting the air-gap-bounding surfaces of said interleaved poles into concentricity by engaging them with a common radially adjustable concentricity establishing device that presses radially in all directions, and securing the adjacent pole parts together in their arcuate and concentric relationship thus established.

19. The method as in claim 18 wherein said circular margins along which said upstanding poles are distributed are inner margins of the annular pole portions of said adjacent pole parts, and wherein said concentricity establishing device presses radially outward in all directions.

20. The method as in either of claims 18 or 19 wherein said arcuate locating means comprises a formation of each of said adjacent pole parts spaced from said upstanding poles thereof and portions of a fixture cooperating with said formations.

21. The method as in either of claims 18 or 19 wherein said adjacent pole parts comprise a said toroidal core structure, and wherein the arcuate locating means comprises an opening in each of said adjacent pole parts spaced from said upstanding poles and parts of a fixture received in said openings.

22. The method as in claim 18 or 19 wherein the motor has at least two of said annular units, and wherein the aforesaid process of assembling, arcuately relating, concentrically adjusting and uniting an adjacent pair of pole pieces is performed successively as to each of the successive pairs of pole pieces of the motor.

* * * * *